SWINGABLE ARM FOR HOLDING A SOUND PICKUP STYLUS

Filed March 27, 1947 3 Sheets-Sheet 1

INVENTOR.
RONALD J. ROCKWELL
BY
Des Jardins & Compton
HIS ATTORNEYS

May 1, 1951 R. J. ROCKWELL 2,551,506

SWINGABLE ARM FOR HOLDING A SOUND PICKUP STYLUS

Filed March 27, 1947 3 Sheets-Sheet 2

INVENTOR.
RONALD J. ROCKWELL
BY
Des Jardins & Rankston
HIS ATTORNEYS

May 1, 1951 R. J. ROCKWELL 2,551,506

SWINGABLE ARM FOR HOLDING A SOUND PICKUP STYLUS

Filed March 27, 1947 3 Sheets-Sheet 3

INVENTOR.
RONALD J. ROCKWELL
BY
Des Jardins & Compton
HIS ATTORNEYS

UNITED STATES PATENT OFFICE 2,551,506

SWINGABLE ARM FOR HOLDING A SOUND PICKUP STYLUS

Ronald J. Rockwell, Cincinnati, Ohio, assignor to Crosley Broadcasting Corporation, Cincinnati, Ohio, a corporation of Ohio Application March 27, 1947, Serial No. 737,594

11 Claims. (Cl. 274—23)

This invention relates to a swingable arm for holding a sound pick-up stylus, and more particularly pertains to such an arm that is spring counter-balanced and of the type adapted for use with horizontally disposed disc records.

One novel feature of the invention resides in the provision of adjustable structures which compensate for differences in tension of the counter-balance spring system, as the arm is swung vertically up and down, to the end that a selected effective weight provided for the stylus does not vary in the various useful vertical attitudes of the stylus arm as it cooperates with records stacked at various levels on the record support.

Another novel feature of the invention resides in the mounting of the arm on pivots for vertical swinging, whereby, although the arm has undamped freedom of vertical motion through a slight angle, after it has come to rest by reason of the resting of the stylus on a record, other larger movements of the arm vertically, up or down, result in a damping means being rendered effective. The slight freedom of vertical swinging is to permit the stylus to freely follow the sound track on a record even though it be warped. The damping means is provided to insure the operator gives a controlled slow movement to the arm as the stylus is being placed on the record or removed therefrom, preventing damage to the stylus or record.

Thus, my novel stylus holding arm, because it is adjustable as to effective weight, is adapted for use with delicate or soft records requiring light stylus pressures, or for records requiring heavier effective stylus weights. The arm also is adapted for use in operations requiring the stacking of records as the selected effective weight is substantially the same for all useful vertical angular dispositions. Moreover, the vertical pivot damping means provides a safety feature to enable the operator to avoid injuring a record by dropping the stylus thereon in a hasty movement or by accident.

In respect to the adjustable compensated spring counter-balance, for the arm, I achieve my novel result not only by providing a main spring counter-balance, adjustable in effect by an auxiliary tension spring, adjustable as to its auxiliary effect, but by providing a compensating compression spring which is effective first on one side of the pivot for vertical motion, and then effective on the other side of said pivot, depending upon the vertical angular disposition of the arm from a substantially normal horizontal position. As the main counter-balancing spring stretches, as the arm descends, the compensating spring becomes effective to counteract the increased support given the arm by the increased stretch of the main spring, and, as the main counter-balancing spring contracts and becomes less effective, as the arm rises, the compensating spring passes a dead-center point, with relation to the pivot for vertical swinging, and becomes effective to aid in the lifting of the arm. The compensating spring is adjustable to give the proper counter-action.

The auxiliary tension spring adjustable anchor is attached to a pointer travelling along a weight scale, so as to advise the operator of the effective adjusted weight of the stylus on the record, and, thus, the effective weight of the stylus on the record can be adjusted accurately according to the demands of the recording by reference to the pointer position.

By selectively adjusting the various springs, I can provide an almost uniform selected effective weight of the stylus on a record in all the various useful vertical attitudes of the arm, because the parts are so positioned, relative to one another, that the compensation of the variable effect of the main counter-balance spring, as it stretches and contracts, is almost perfect.

The main counter-balancing spring and the adjustable auxiliary spring are ordinary coil springs, both anchored under tension. The compensating spring is a leaf spring, having a compressible formation which is under compression when said spring is inserted in place, between two support points, and the compressive force, which endeavors to lengthen the spring, has a dead-center action when the two support points of the spring are in line with the pivot for vertical movement of the arm. The compensating spring acts to aid in raising the arm when the arm is moved upwardly above such dead-center position, and acts to aid the arm to lower when the arm is moved downwardly below such position. The dead-center position is selected to be, as nearly as possible, at the normal horizontal position of the arm.

As in standard arms of this type, a gimbals support is provided to give the arm universal motion within the necessary useful limits, and an improved and novel construction has been provided, as has been said, to damp, within certain limits, the vertical action of the arm. To achieve the most exact following of the record groove, the utmost freedom of motion must be allowed ror a slight angular movement in the vertical sense, so that the effective weight of the stylus on the record will be constant, although slight undulations of the sound track are present due to defects in the record or in support table, or because of the warping of the record. Beyond such slight freedom of movement in a vertical sense, it is desirable to have that motion damped, to prevent the operator giving uncontrolled quick movements to the arm. To this end, I have provided a pivot for vertical arm movement that gives freedom of motion through the slight angle necessary for the arm to follow the sound track, but which is provided with a damping means beyond the limits of such angle of freedom. This is accomplished by providing inner and outer cylindrical surfaces which move together, for slight angular distances, but which move differentially beyond such limits, the differential movement being retarded by a film of viscous material interposed between the said outer and inner cylindrical surfaces. The parts are so constructed that, after the stylus has been placed on a record, the free vertical action occurs at that vertical angle, and this is so regardless of the angle at which the arm is used. The very light weight of the stylus arm and its counter-balancing system contributes greatly to the freedom of vertical motion within the described limits by reason of its low inertia.

Therefore, the principal object of the invention is to provide an arm for holding a sound record stylus wherein the extended weight of the arm is counter-balanced by a system of springs which are interrelated so as to give a constant effective weight of the stylus upon a record, regardless of the vertical angular position of the arm, within the useful limits of the device.

Another object of the invention is to provide such an arm wherein the correcting effect imposed upuon the counter-balancing spring is provided by use of a compensating spring which acts first on one side and then on the other side of the pivot for vertical movement as the arm passes through a dead-center position, which said dead-center position occurs when the arm is approrimately horizontal.

Another object of the invention is to provide such an arm wherein, whatever position the arm is in vertically, there is freedom of motion through a slight vertical angle and damped freedom of motion therebeyond.

Another object of the invention is to provide such an arm wherein the counter-balancing tension springs may be so adjusted relative to one another that the effective weight of the stylus on a record may be selected.

Another object of the invention is to provide such an arm wherein the effective weight of the stylus on the record may be read directly upon a scale by means of a pointer controlled by a settable adjustment for the auxiliary tension spring.

Further objects, and objects relating to the details and economies of construction will definitely appear from the detailed description to follow.

In one instance I have accomplished the objects of my invention by the devices and means set forth in the following specification. My invention is clearly defined and pointed out in the appended claims.

Structures, constituting the preferred embodiment of my invention, are illustrated in the accompanying drawings, forming a part of this specification, in which.

In the drawings, the same reference numerals refer to the same parts throughout the several views and the sectional views are taken looking in the direction of the arrows at the ends of the section lines.

Figure 1:
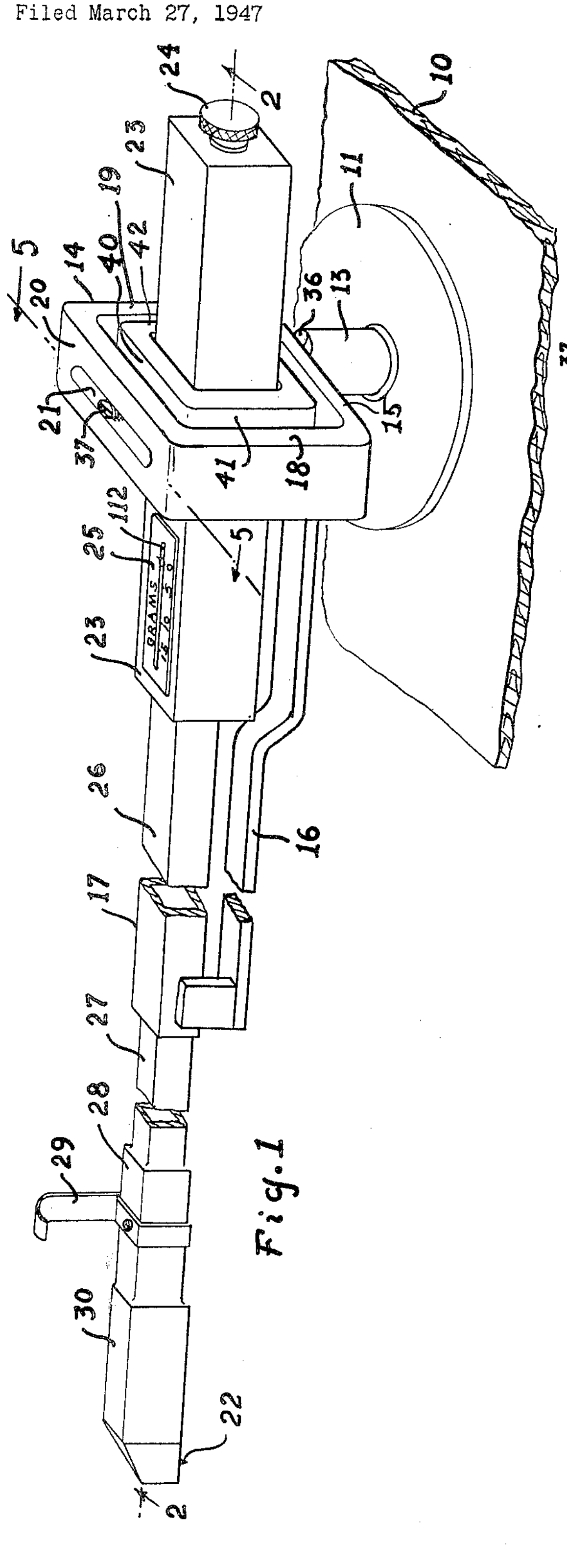
Fig. 1 is a broken perspective view of the stylus arm and mounting, showing, in a general way, the relationship of the parts, and, in particular, the weight indicator scale.
Figure 2:
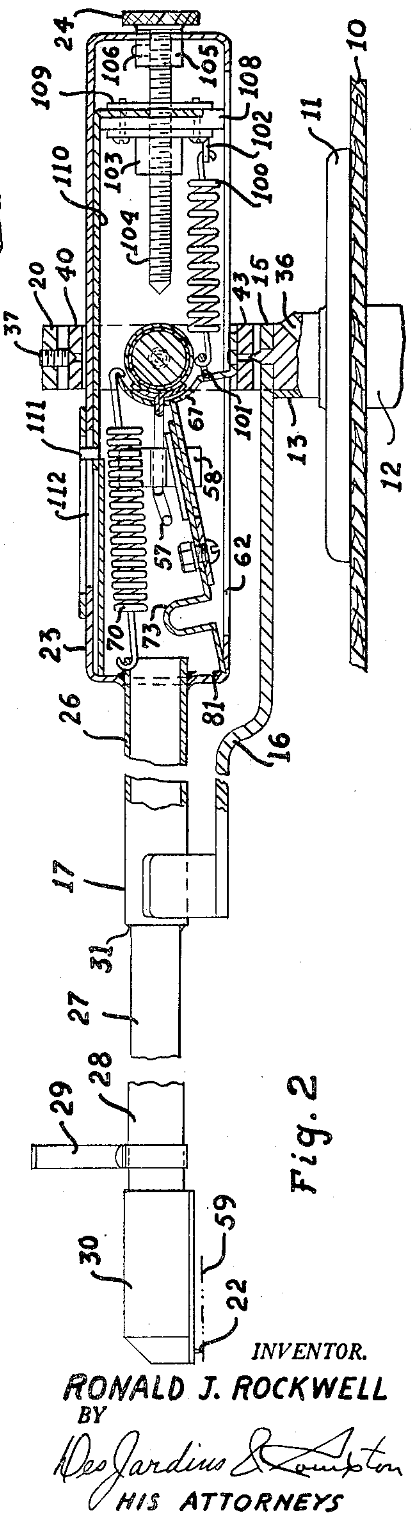
Fig. 2 is a broken side elevation of the stylus arm and mounting, partly in section, approximately on the line 2—2 of Fig. 1.

Fig. 1 is a perspective view of the stylus holding arm and its mountings, in which may be seen a typical platform 10 having a plate 11 mounted thereon which holds a post socket 12 (see also Fig. 2) into which is rotatably seated a vertical post 13 on which is mounted a gimbals bracket 14, having extending horizontally from the bottom cross member 15 a forwardly projecting arm rest 16 upon which the stylus arm 17 may rest when not in use. The gimbals bracket 14 (Fig. 5) has, in addition to the bottom cross member 15, mentioned, two upwardly extending side members 18 and 19, and a top cross member 20 having a slot 21 cut therein. The gimbals bracket, thus, is a rectangular frame and normally is oriented by turning post 13 in its socket until the arm rest 16 is positioned to hold the stylus arm 17, when it is not in use, to one side of the edge of the record support shown as a broken line 59 (Fig. 2).

The arm 17 is pivotally mounted in the gimbals bracket 14, by means which will be described later, in detail, so as to have a universal movement, within certain useful limits, to permit the stylus 22 to follow sound grooves, or to be selectively placed on a record, and to swing vertically as in placing or removing the stylus with respect to a record, whether such record is directly on the record support or on top of a stack of records on the record support.

It will be observed, in general, that there are several sections to the arm. Section 23 (Fig. 1) contains the counter-balancing mechaninsm and has a portion which extends rearwardly of the gimbals bracket 14 from which extends an adjustment screw 24, and has a portion which extends forwardly of bracket 14 which has a weight indication scale 25 thereon. Extending forwardly from the forward end of section 23 is a reduced portion 26, a neck portion 27, a pick-up head holding section 28, which has a lifting hook 29 attached thereto, and a stylus holding pick-up head 30 attached to the extreme end. The sections of the arm are hollow, where necessary to house wiring and mechanism to be described. Sections 27 and 26 are joined by a slip joint (Fig. 8) having therein a separating layer 31 of acoustical damping material to prevent unwanted resonance vibrations being transmitted along the arm. A plasticized nitrocellulose-camphor compound, preferably, is used for such damping material. Suitable material for this purpose may be plasticized with castor oil or tricresyl phosphate as set out in U. S. Patent No. 1,430,020. The structural details and advantages of this type of acoustically damped tone arm are fully described and claimed in my copending application Serial No. 745,697, filed on May 3, 1947. Section 28 of the arm may be joined to section 27 in the same manner, if desired, or may be otherwise secured, as by welding or by fitting of the parts. As shown in Fig. 2, section 26 is slipped into and welded to section 23, and protrudes slightly into the interior of section 23 where a hole therein serves as a spring anchor for spring 70.

The stylus, the stylus head, the extended arm portions of the unit, and the arm rest, are shown for the purpose of giving a preferable environment for the disclosure of the novel subject matter of the invention, but are not to be deemed to limit the invention, as other similar types of arms may be used therewith.

It is to be understood, however, that I am providing a low inertia unit and, therefore, the arm should be of as light a construction as possible, consistent with strength. The damping material, described, for joining the sections of the arm is used where necessary to remove resonance vibrations which interfere with the fidelity of the sound reproduction.

Coming, now, to describe the universal movement support for the arm, I provide in the gimbals bracket 14 (Fig. 5) an upwardly directed pivot 34, extending through a hole in bottom cross piece 15, which pivot is part of a plug 35 secured in the hollow interior of post 13. The point of pivot 34 is on the axis of rotation of post 13 in its socket.

Figures 5, 6, 7, 8, 9:
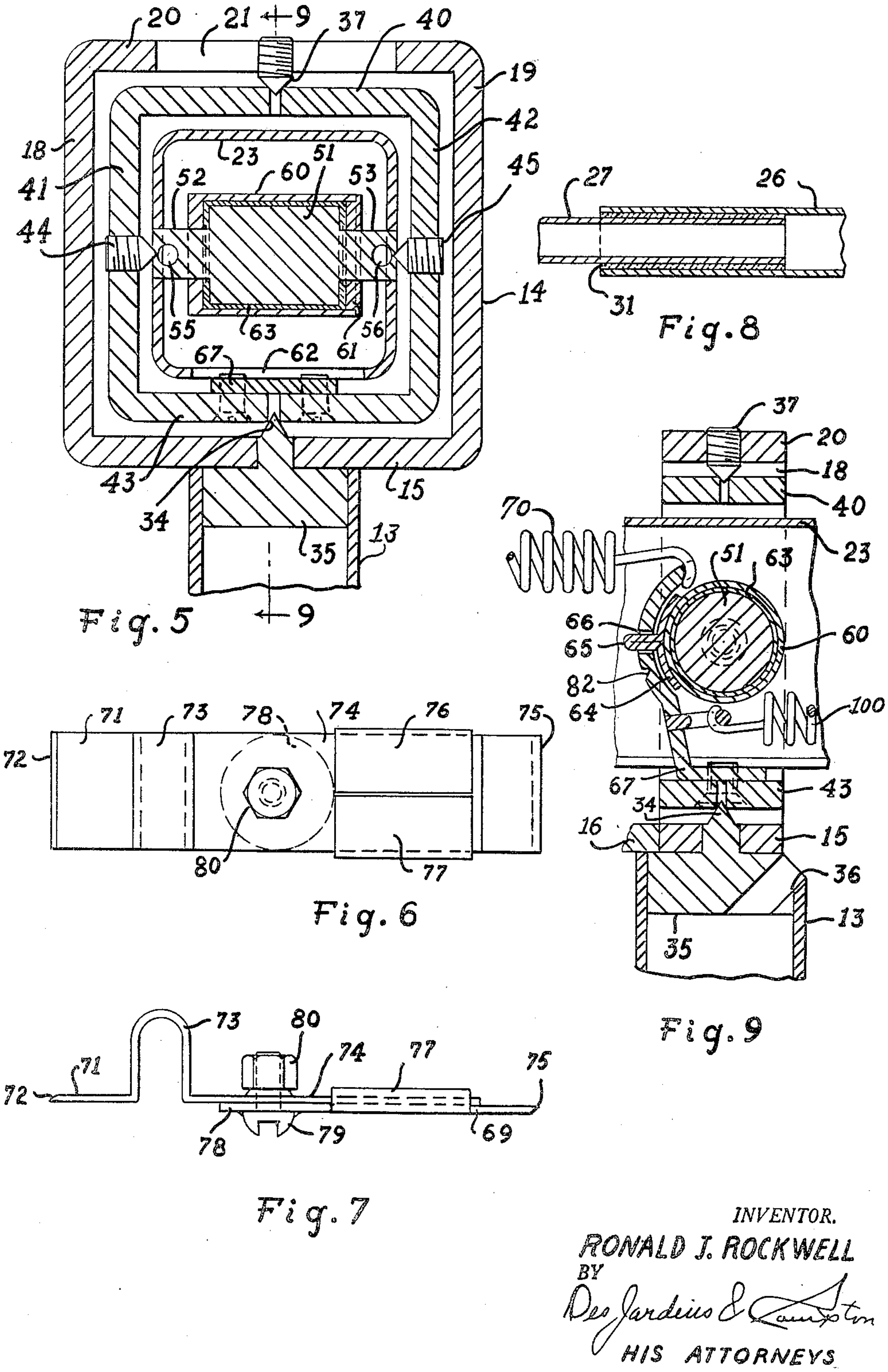
Fig. 5 is a section through the gimbals on the line 5—5 of Fig. 1.
Fig. 6 is a detail plan view of the compensating spring.
Fig. 7 is a detail side elevation of the compensating spring shown in Fig. 6.
Fig. 8 is a sectional view through a typical reduction joint along the length of the arm, showing acoustical insulation therein.
Fig. 9 is a partial section on the line 9—9 of Fig. 5, showing, additionally, the coil spring anchors, and the pin and slot free movement device.

As seen in Fig. 9, a hole 36 is cut into the side of the upper edge of post 13 and through a portion of plug 35 to accommodate wiring from the pick-up head which is led through apertures in the bottom of section 23 of the arm.

An upper pivot 37 in line with pivot 34 on the vertical axis of rotation of post 13, has its point directed downwardly. Pivot 37 is screwed into cooperating partial threads cut in the sides of slot 21, the threaded construction being provided for purposes of adjustment.

Between pivots 34 and 37 is mounted a swivel ring having a top piece 40, side pieces 41 and 42, and bottom piece 43. The pivot points of pivots 34 and 37 enter bearing holes in pieces 43 and 40, respectively. The swivel frame thus formed is rectangular and, as will be apparent, serves to permit horizontal movement of the arm.

Horizontally aligned pivots 44 and 45 are screwed into threaded holes in the side pieces 41 and 42 respectively, of the swivel frame, and are so positioned that the line between their points crosses the vertical axis defined by a line connecting the points of pivots 34 and 37.

The swivel ring pivots 44 and 45 act as bearings for an arm support member, comprising a metal cylinder 51 having ends 52 and 53 of smaller diameter which are engaged by pivots 44 and 45, respectively, so that the cylinder 51 rotates on its long horizontal axis.

Holes in either side of section 23 of the stylus arm permit the entry therethrough of ends 52 and 53 of cylinder 51 which is located on the inside of section 23 of the said arm, said section 23 of the arm passing through the rectangular hole of the swivel ring, as seen best, in section in Fig. 5.

Holes 55 and 56 in ends 52 and 53, respectively, are for receiving pins secured to the inside of section 23 of the stylus arm to fasten the arm to the cylinder 51 for rotation together. Fig. 2 shows a pin 57 held by metal strap 58 secured to the arm, said pin having its rearwardly extending end piercing hole 55 in end 52 (Fig. 5) of cylinder 51. The pin cooperating with hole 56 is similar and is fastened to the arm, in the same manner, on the opposite side.

From the foregoing, it is seen that the arm holding the stylus is supported for limited universal movement.

*Vertical movement damping means*

Figure 3:
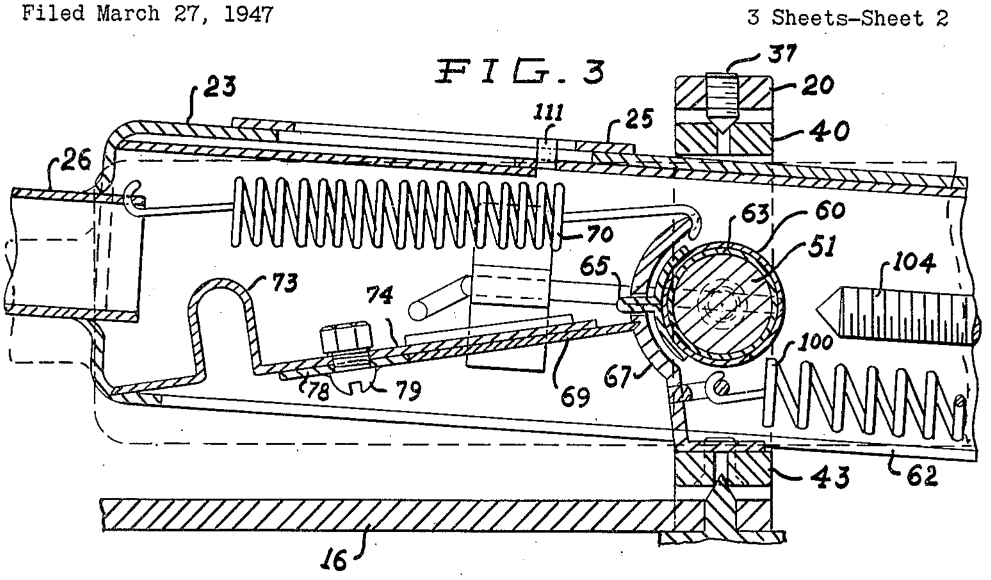
Fig. 3 is a detail of part of the right end of Fig. 2 showing the arm raised from the normal horizontal position shown in broken lines.
Figure 4:
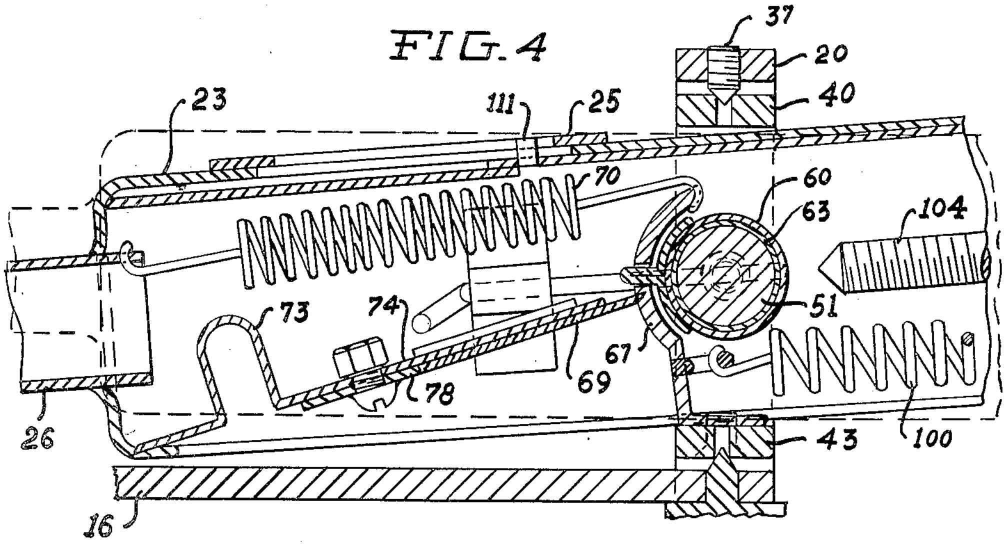
Fig. 4 is a detail of part of the right end of Fig. 2 showing the arm lowered from the normal horizontal position shown in broken lines.

The vertical movement of the stylus arm is left free for a slight angular movement whenever the stylus is placed on a record, no matter whether the disposition of the record on the support demands that the arm be horizontal, as shown in Fig. 2, or inclined upwardly as shown in Fig. 3 in full, or inclined downwardly as shown in Fig. 4 in full. The freedom of vertical angular movement, preferably, is made such as to give a free vertical movement to the stylus of about one-quarter of an inch, which is sufficient to permit it to react to undulations commonly occurring in records, without varying the adjusted weight of the stylus on the sound track except as affected by the inertial mass of the arm. No matter in what angular position the arm is placed initially, the free action is immediately adjusted to be effective at such angular position by a centering action of the parts.

Referring to Figs. 5 and 9, the central portion of cylinder 51 is encased in a metal drum 60 having a hole in its bottom through which end 52 passes (see Fig. 5) and having a cap 61 containing a hole through which end 53 passes. The clearance between the cylinder 51 and the drum 60, preferably, is about five-thousandths of an inch, and the space between is filled with a viscous material 63, preferably of a type which resists atmosphere and temperature changes, such as a dimethyl-silicon-oxide polymer. I also prefer to add a wood pulp filler to the viscous material to reduce the effective mass thereof. Thus, the drum and cylinder move relatively to one another, but with a frictionally damped action.

Secured to the outside of drum 60 is a plate 64 (Fig. 9) having a crimped portion extending radially outward as a pin 65. Pin 65 plays in a vertical slot 66 cut in a spring anchor standard 67 secured, by screws, to bottom piece 43 of the swivel ring of the gimbals, which standard projects through aperture 62 in the bottom of section 23 of the arm.

The vertical length of slot 66 determines the free movement of cylinder 51 and of the attached stylus arm and it is adjusted to give the correct vertical freedom at the stylus. After the limits of the free movement of the arm are reached the damping action of the viscous material between the cylinder and the drum resists such movement. Assuming the stylus has been taken from its rest 16, swung by an operator upwardly, across, and downwardly onto a record, the pin 65 would be in the bottom of slot 66, but would tend to assume an intermediate position, immediately, at the first undulation of the record.

Thus, the stylus arm is free to follow ordinary record irregularities, but is restrained upon larger vertical movements to a slow controlled movement that permits the operator to adjust the stylus to the record with ease and safety.

*Compensated spring counter-balance*

The objectives of the controlled spring counterbalance mechanism for the stylus arm are to reduce inertia of the vertical movement of the arm through its free movement, by elimination of counter-weights in favor of the lighter spring mechanism, to improve the action of such spring counter-balance means by compensating for the difference in its action as the spring changes form, and to permit a controlled adjustment of the effective weight of the stylus on a record.

Referring to Fig. 2, I provide a main counterbalancing coil spring 70 anchored at its forward end to the hole in the rear end of section 26 of the stylus arm and anchored at its rear end to the upper end of standard 67. The spring 70 is of such strength and under such a tension, when so anchored, as to give support to the arm, when it is in horizontal position, as will produce a normal effective weight on the stylus when acting in conjunction with the other springs to be described. It will be seen that spring 70 is so positioned and anchored as to tend to raise the arm, that without any compensating device, as the arm is raised (Fig. 3) the spring will contract and be less effective, and that as the arm is lowered (Fig. 4) the spring will stretch and be more effective, assuming the spring is operating within its elastic limits. This is an undesirable condition as, when records are played from a stack on the record support, the lowermost record is played as the stylus has a low effective weight, because the spring gives more lift, and, as the uppermost record is played, the stylus has a high effective weight, because the spring gives less lift.

I, therefore, have provided novel means for compensating for this spring action by providing a compensating spring (shown in detail in Figs. 6 and 7) which is positioned with relation to the stylus arm and pivots for vertical swinging so that it is in an ineffective, dead-center, position when the arm is substantially in a normal horizontal position, which aids the spring 70 when the arm is above such normal position, and which resists the spring 70 when the arm is below such normal position.

Referring to the enlarged showings of the compensating auxiliary spring in Figs. 6 and 7, the spring is made of two parts of flat metal, part 71 having a foot 72, a U-shaped compression formation 73, and a tail 74, and part 69 having a foot 75, and clasping fins 76 and 77 under which tail 74 is slidable. Bolt 79 has, welded thereto, an eccentric cam 78, said bolt being passed through a hole in tail 74 and secured by a nut 80. The hole in tail 74 is upset, slightly, to give a locking effect as the nut 80 is tightened. By turning bolt 79 the distance which tail 74 may slide into the fins 76 and 77 is determined. This auxiliary compensating spring is used under compression and hence the adjustment of cam 78 determines its effective length and strength.

Referring to Fig. 2, the foot 72 is placed against the forward wall of section 23 of the arm, in notch 81, and the foot 75 is placed, in a notch 82 (Fig. 9), against standard 67. The adjustment bolt 79 is turned to give the proper compression to formation 73.

Referring to Fig. 2, it will be seen that when the stylus arm is in horizontal position the compensating spring is in a dead-center position with respect to the pivot for vertical swinging of the arm and, hence, has no effect on the effective lifting force of coil spring 70. When the arm is raised above normal, as in Fig. 3, the compensating spring is effective to aid spring 70 to urge the arm upward, its line of effectiveness being below the pivots. When the arm is lowered below normal, as in Fig. 4, compensating spring is effective to tend to counteract the spring 70, its line of effectiveness there being above the pivots.

By proper choice of springs, a very nearly constant effective weight of the stylus on records of a stack at various heights may be achieved through adjustment of the eccentric cam. A hole 62, cut in the bottom of section 23 of the arm gives access to the screw slot of the adjusting bolt 79.

I am fully aware that the kinds and positions of the springs may be varied in carrying out my novel idea which in principle relates to overcoming the variations in effectiveness of a spring, as it is stressed, in its use as a counter-balance for a stylus holding arm. Although the actual stretch of a spring located as is main spring 70, in commercially usable devices, is less than half an inch from one extreme of useful movement to the other, the fact that the arm normally is in almost perfect counter-balanced condition renders such stretch enough to make the effective stylus weight zero on a few degrees downward movement from normal. The opposite is true on upward movement from normal. My novel compensating means eliminates such variable effective weight of the stylus.

*Effective weight adjustment*

To adjust the normal effective weight on the stylus, which weight should be varied according to the delicacy of the recording or the recording medium, I have provided an auxiliary coil spring 100 (Fig. 2) anchored under tension at its forward end to spring anchor 101 secured in standard 67, and anchored at its rear end to a spring anchor 102 secured to a nut 103 travelling on an adjusting screw 104 let through the rear wall of section 23 of the arm and secured therein by collar 105 and set screw 106. By adjusting the screw 104 to give proper tension to spring 100 the effectiveness of main spring 70 may be adjusted, decreasing the tension of spring 100 increasing the effective stylus weight.

Secured to nut 103, by means of screws, is a plate 109 clamping a forwardly extending tongued piece 110 carrying a pointer 111 extending through a longitudinal slot 112 in the top of section 23, which pointer rides opposite the weight scale plate 25 (Fig. 1) which may be scaled in grams of effective stylus weight. A felt washer 108 (Fig. 2) is provided in the space between nut 103 and plate 104 to reduce vibration.

The operator may turn adjusting screw 24 to suit the characteristics of a record to be sensed.

I am aware that the device illustrated and described herein is susceptible of considerable variation without departing from the spirit of my invention and, therefore, I claim my invention broadly as indicated by the appended claims.

Having thus described my invention, what I claim as new and useful, and desire to secure by Letters Patent, is:

1. In a counter-balancing device for a stylus holding arm adapted to cooperate with horizontally disposed disc sound records, the combination of a gimbals support having a gimbals bracket, a swivel ring pivoted on vertically aligned pivots held in the bracket, and having a stylus arm support pivoted within the swivel ring on horizontally aligned pivots; and a friction member embracing the stylus arm support and supported thereby, said friction member normally tending to follow the rotational movement of the stylus arm support, but which is restrained therefrom by a pin and slot connection between the friction member and the swivel ring.

2. In a counter-balancing device for a stylus holding arm adapted to cooperate with horizontally disposed disc sound records, the combination of a gimbals support having a gimbals bracket, a swivel ring pivoted on vertically aligned pivots held in the bracket, and having a stylus arm support pivoted within the swivel ring on horizontally aligned pivots; and a friction member embracing the stylus arm support and supported thereby, said friction member being separated from the stylus arm support by a layer of viscous fluid material being interposed therebetween thus causing said friction member to tend to follow the rotational movement of the stylus arm support, but which is restrained therefrom by a pin and slot connection between the friction member and the swivel ring.

3. In a damping mechanism for a tone arm mounting having a fixed support, a swivel member pivotally mounted on the fixed support for rotation about a vertical axis; an upright standard on the swivel member having a vertical elongated slot therein, a cylinder supported by the swivel member for rotation about a horizontal axis, a drum fitted over the cylinder so as to provide an annular chamber therebetween, a plate on the drum having a radial projection in register with the vertical slot and adapted to permit limited rotation of the drum relative to the standard, a charge of viscous material in the annular chamber and means operatively connecting the tone arm to the cylinder for unitary movement therewith.

4. In a damping mechanism for a tone arm mounting having a fixed support, a swivel member mounted on the fixed support for rotation about a vertical axis, a standard on the swivel member having a vertical slot therein, a cylinder supported by the swivel member for rotation about a horizontal axis, a drum fitted over the cylinder so as to provide an annular chamber therebetween, such drum having thereon a projection in register with the vertical slot and adapted to permit limited rotation of the drum relative to the standard, a charge of viscous material in the annular chamber and means operatively connecting the tone arm to the cylinder.

5. In a damping mechanism for a tone arm mounting having a fixed support, a swivel member pivoted on the fixed support; a standard on the swivel member having a slot therein, a cylinder supported for rotation by the swivel member, a drum on the cylinder providing an annular chamber therebetween, such drum having a projection in register with the slot and adapted to permit limited rotation of the drum relative to the standard, a charge of viscous material in the annular chamber, and means connecting the tone arm to the cylinder.

6. In a damping mechanism for a tone arm mounting, a cylinder, means for supporting said cylinder for rotation about a horizontal axis, a tone arm supported on the cylinder for rotation therewith, a stylus holding member supported by the arm, a standard secured against rotation about a horizontal axis and having a slot therein, a drum on the cylinder providing an annular chamber therebetween, such drum having a projection in register with the slot and adapted to permit limited rotation of the drum relative to the standard and a charge of viscous material in the annular chamber so as to damp any relative movement between the cylinder and the drum.

7. In a counterbalanced tone arm mounted for vertical swinging movements above and below a substantially horizontal operative position a fixed standard having a slot vertically disposed therein, a cylinder pivotally supported by said standard for rotation about a horizontal axis, a drum surrounding said cylinder defining an annular chamber therebetween, a radial projection secured to said drum in register with the slot which limits the extent of conjoint rotation of said drum when said cylinder is rotated about its horizontal axis, viscous damping material within the annular chamber, means rigidly connecting the tone arm to said cylinder, a tension spring stretched between a portion of said standard and a part of the tone arm remote from said standard whereby a counterbalancing torque is gradually produced to offset the weight of the tone arm as it is lowered, a compression spring bearing on said standard and another part of the tone arm remote from said standard, the bearing points of said compression spring being aligned with the axis of rotation of said cylinder only when the tone arm is disposed in a horizontal position, said compression spring opposing the torque produced by said tension spring when the tone arm is below its horizontal position and augmenting the torque of said tension spring when the tone arm is above its horizontal position whereby the weight of the tone arm is uniformly counterbalanced in all operating positions, limited rotation of the tone arm about the axis of said cylinder being possible solely under the influence of said tension and compression springs and the weight of the tone arm through limited angles determined by the position of said projection within the slot of said standard but movement of the tone arm beyond such limited rotation being opposed by the damping action of said viscous damping material subjected to the relative movement between said cylinder and said drum.

8. In combination in a counterbalanced tone arm which is rotatable through a range of operating positions, a support pivotally supporting the tone arm for rotation about an axis fixed relative to said support, a tension spring stretched between said support and a point on the tone arm remote therefrom whereby a gradually increasing torque is produced to counterbalance the weight of the tone arm as it is swung in one direction through its operating range, a compression spring bearing on a point of said support and another point of the tone arm remote therefrom, the bearing points being aligned with the rotational axis of the tone arm only when it is in a mean operating position, the bearing points lying on a line disposed on opposite sides of the rotational axis when the tone arm is displaced from its mean operating position, said compression spring alternately augmenting and opposing the variable torque produced by said tension spring when said tone arm is moved from one side of its mean operating position to the other whereby the weight of the tone arm is continuously counterbalanced in all positions of operation.

9. In combination with a counterbalanced tone arm having an extended end which is vertically movable for engagement with a record, a support for pivotally supporting the tone arm for rotation about a horizontal axis fixed relative to said support, a standard rigidly secured to said support adjacent the fixed axis, a tension spring stretched between said standard and a remote point on the tone arm whereby a torque is produced to counterbalance the weight of the extended end of the tone arm, threaded adjusting means rotatably secured to the other end of the tone arm remote from its extended end, a second tension spring stretched between said threaded adjusting means and said standard whereby the torque produced by said first named tension spring is supplemented, and a compression spring bearing on said standard and a point on the tone arm remote from said standard, the bearing points of said compression spring being in alignment with the axis of rotation of the tone arm only when the tone arm is disposed in a substantially horizontal position, said compression spring augmenting the torque produced by said tension springs when the tone arm is displaced from its horizontal position in one direction and opposing the torque produced by said tension springs when the tone arm is displaced from its horizontal position in the other direction; whereby the tone arm is uniformly counterbalanced through a range of operating positions above and below the horizontal position.

10. Apparatus as defined in claim 9 and in addition, an indicator gage associated with said threaded adjusting means whereby the tension of said second tension spring is indicated.

11. In combination in a counterbalanced tone arm which is rotatable through a range of operating positions, a support pivotally supporting the tone arm for rotation about an axis fixed relative to said support, a tension spring stretched between said support and a point on the tone arm remote therefrom whereby a gradually increasing torque is produced to counterbalance the weight of the tone arm as it is swung in one direction through its operating range, a compensating spring formed of two strips of metal joined end to end by an adjustable slip joint, said compensating spring bearing on a point of said support and another point of the tone arm remote therefrom, the bearing points being aligned with the rotational axis of the tone arm only when it is in a mean operating position, the bearing points lying on a line disposed on opposite sides of the rotational axis when the tone arm is displaced from its mean operating position, said compensating spring alternately augmenting and opposing the variable torque produced by said tension spring when said tone arm is moved from one side of its mean operating position to the other whereby the weight of the tone arm is continuously counterbalanced in all positions of operation.

RONALD J. ROCKWELL.

REFERENCES CITED

The following references are of record in the file of this patent:

UNITED STATES PATENTS

| Number | Name | Date |
|---|---|---|
| 1,866,403 | Elmer | July 5, 1932 |
| 2,016,505 | Lucarelle | Oct. 8, 1935 |
| 2,154,093 | Hutter | Apr. 11, 1939 |
| 2,174,156 | Guedon | Sept. 26, 1939 |
| 2,230,865 | Hutter | Feb. 4, 1941 |
| 2,258,222 | Rochow | Oct. 7, 1941 |
| 2,331,122 | Jones | Oct. 5, 1943 |
| 2,391,467 | Loepsinger | Dec. 25, 1945 |
| 2,398,187 | McGregor et al. | Apr. 9, 1946 |
| 2,421,822 | Wood | June 10, 1947 |
| 2,445,762 | Chanal | July 27, 1948 |